United States Patent [19]

Stone et al.

[11] 4,446,745
[45] May 8, 1984

[54] APPARATUS FOR COUNTING TURNS WHEN MAKING THREADED JOINTS INCLUDING AN INCREASED RESOLUTION TURNS COUNTER

[75] Inventors: Lyndon R. Stone, San Antonio; James D. Hall, Austin, both of Tex.

[73] Assignee: Baker International Corporation, Orange, Calif.

[21] Appl. No.: 253,118

[22] Filed: Apr. 10, 1981

[51] Int. Cl.³ .............................................. G01L 5/24
[52] U.S. Cl. ................... 73/862.25; 29/240; 364/506; 377/47
[58] Field of Search ................ 73/761, 862.23, 862.24, 73/862.25; 29/240, 407; 364/506, 508; 377/47

[56] References Cited

U.S. PATENT DOCUMENTS

| | | | |
|---|---|---|---|
| 3,739,276 | 6/1973 | Dornberger | 235/92 DN X |
| 4,074,196 | 2/1978 | Webster | 235/92 DN X |
| 4,091,451 | 5/1978 | Weiner et al. | 73/862.23 X |
| 4,176,436 | 12/1979 | McCombs et al. | 73/862.23 X |
| 4,194,184 | 3/1980 | Hartmann et al. | 250/231 SE X |

Primary Examiner—Charles A. Ruehl
Attorney, Agent, or Firm—Norvell & Associates

[57] ABSTRACT

An apparatus for controlling the number of turns made and the torque applied during the operation of making a threaded joint includes a high resolution turns counter. The turns counter senses the rotation of a member of the joint and generates a pulsed signal, each pulse representing a predetermined increment of rotation. The turns counter includes an idler wheel driven by one member of the joint and in turn driving an encoder which generates a relatively large number of pulses per revolution of the idler wheel. A presettable divide-by-N circuit is utilized to divide the encoder pulses to generate a pulse train to a monitoring and control apparatus for indicating whether a good or a bad joint has been made. The divide-by-N counter can be preset to generate a predetermined number of pulses per revolution of the joint member or pulses representing a predetermined percentage of a total number of turns to be made.

10 Claims, 8 Drawing Figures

APPARATUS FOR COUNTING TURNS WHEN MAKING THREADED JOINTS INCLUDING AN INCREASED RESOLUTION TURNS COUNTER

BACKGROUND OF THE INVENTION

1. Field of the Invention

The present invention relates in general to an apparatus for monitoring the operation of making threaded tubular joints and in particular to an apparatus for counting the number of turns in such an operation.

2. Description of the Prior Art

After a bore hole has been drilled to an oil or gas despoit, pipe strings are run into the bore hole for removing the oil or gas. The pipe strings are assembled at the well site from pipe sections each having external threads at one end and an internally threaded box member at the other end or external threads at both ends for use with an internally threaded coupling collar. As the pipe sections are connected together, they are run into the bore hole. Each pipe section is assembled to the top of the pipe string utilizing a power tongs unit which has a rotary jaw member for gripping the pipe and a motor for rotating the jaw member until the pipe section has been tightened to the desired degree. The joint must be tight enough to prevent leakage and to develop high joint strength but not so tight so as to damage the threads.

Early prior art techniques involved the determination of the applied torque to achieve the desired degree of tightness in the joints. For example, one technique involved the adjusting of the air supply maximum output pressure to a pneumatically driven tong motor to provide the required maximum torque as dictated by joint properties and tong power characteristics. Thus, the proper torque was developed when the tong motor stalled. Another technique involved the counting of the number of turns after the threads had been engaged at a "hand tight" point. These early techniques were unsatisfactory since torque alone or turns alone could not guarantee that the threaded joint would not leak.

One prior art device which attempted to solve the problem included means for producing a signal indicating the number of turns of the pipe section after measurement of a given torque by the torque measuring means. The device produced a warning of a bad joint upon the measurement of a predetermined maximum torque before a measurement of a predetermined minimum number of turns had occurred or the measurement of the predetermined maximum number of turns before the measurement of the predetermined minimum torque had occurred. The device indicated a good joint upon the measurement of the predetermined minimum torque value between the measurement of the minimum and maximum number of turns. Such a device is shown in U.S. Pat. No. 3,368,396 issued Feb. 13, 1968. Improvements to that device are disclosed in U.S. Pat. No. 3,606,664 issued Sept. 21, 1971, U.S. Pat. No. 3,745,820 issued July 17, 1973, and U.S. Pat. No. 4,091,451 issued May 23, 1978.

U.S. Pat. No. 4,176,436 discloses a method and an apparatus for making threaded joints within a wide range of predetermined applied torque and turns values. A pipe or a pipe and a coupling are threaded onto the end of a pipe string. The applied torque is monitored and, when a reference torque value is exceeded, the number of turns are counted. When either the actual torque or the actual turns exceeds a predetermined minimum value for that parameter and the value of the other parameter exceeds a predetermined minimum value, but is less than a predetermined maximum value, a good joint is indicated and the make-up is stopped. A bad joint is predicted and make-up is stopped when the value of the actual torque divided by the actual turns falls outside a range of values defined by the slopes of a pair of boundary lines and predetermined minimum torque and minimum turn values. The actual turns value is a count which is initiated the first time the actual torque value equals the reference torque value, the count being incremented when the actual torque value is greater than the reference torque value and being decremented when the actual torque value is less than the reference torque value.

The prior art devices typically used turns counters which generated a signal representing one tenth of a revolution of the joint member. Such a low resolution is not suitable for making joints where there may be less than one complete turn between the reference torque and the maximum torque. Furthermore, each time a different pipe diameter was utilized, the device had to be recalibrated to generate the one tenth of a turn signal. For example, if the rotation of the joint member was sensed by a wheel engaging the outer surface of the joint member, a different diameter wheel had to be substituted to maintain the same ratio of joint member diameter to wheel diameter.

SUMMARY OF THE INVENTION

In the present invention, an idler wheel is biased into engagement with the outer surface of the joint member being rotated. The idler wheel is coupled to an encoder which generates a pulse train having a relatively high number of pulses per revolution of the idler wheel. A presettable divide-by-N counter receives the pulse train and generates an output pulse for each "N" input pulses. The output pulses are utilized by an apparatus for controlling the number of turns made and the torque applied during the operation of making a threaded joint.

The number "N" can be selected to provide pulses representing a predetermined increment of rotation of the joint member or a predetermined percentage of a number of turns to be made.

For example, if the encoder generates 10,000 pulses per revolution of the idler wheel and the joint member outside diameter is five times the diameter of the idler wheel, then the encoder generates 50,000 pulses for each revolution of the joint member. If "N" is selected to be 500, the divide-by-N counter will generate output pulses representing 1/100 of a revolution of the joint member. If 0.7 turn is to be made, then "N" is selected to be 350 and each output pulse represents one percent of 0.7 turn.

Furthermore, the number "N" can be selected to accommodate a wide range of joint member diameters. If the joint member diameter were changed to be six times the idler wheel diameter, the numbers 500 and 350 become 600 and 420 respectively to generate the same number of output pulses. Thus, the idler wheel does not have to be changed as in the prior art turns counters.

DESCRIPTION OF THE PREFERRED EMBODIMENTS

Figure 1:
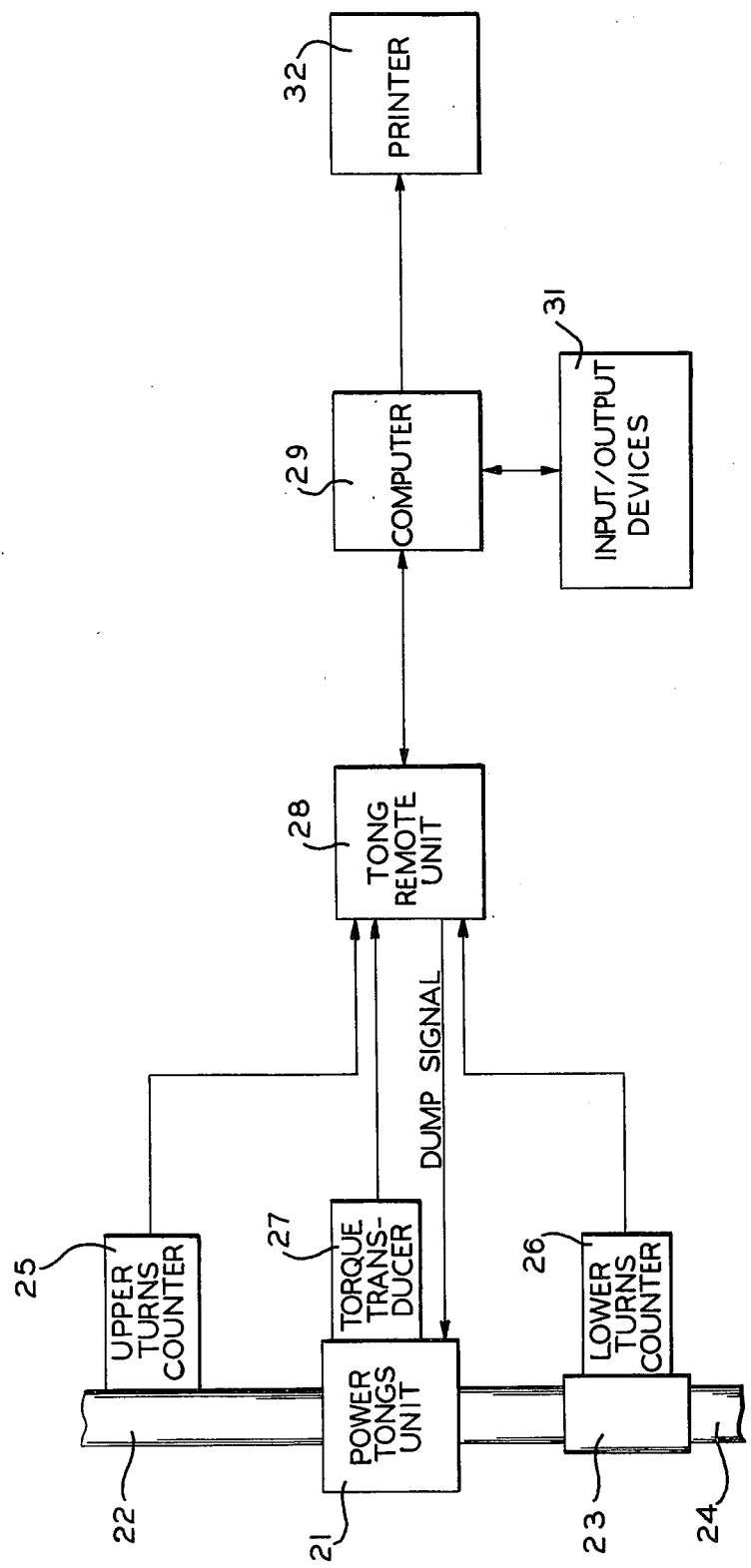
FIG. 1 is a block diagram of a prior art apparatus for threading pipe and a control system therefor which can utilize the turns counter according to the present invention.

FIG. 1 is a block diagram of a torque and turns controller which is disclosed in more detail in U.S. Pat. No. 4,176,436 issued Dec. 4, 1979. The disclosure of said patent is incorporated herein by reference. Reference numerals below 200 as used herein represent the same elements in said patent. A power tongs unit 21 grips and rotates a pipe section 22, the lower end of which is threaded into a pipe coupling 23 which, in turn, is threaded into the upper end of a pipe section 24. The pipe section 24 represents the upper end of a pipe string extending into the bore hole of a well (not shown). The power tongs unit 21 is well-known in the industry and is not shown in detail.

An upper turns counter 23 senses the rotation of the upper pipe section 22 and generates a signal representing such rotational movement. Similarly, a lower turns counter 26 senses the rotation of the pipe coupling 23 and generates a signal representing the torque applied to the upper pipe section 22 by the power tongs unit 21. The signals from the counters 25 and 26 and from the transducer 27 are inputs to a tong remote unit 28. A computer 29 monitors the counters and transducer signals and compares the present values of these signals with operator entered values to provide control signals to the operator. The operator enters values of low, minimum and maximum turns and reference, minimum and maximum torque through an input device, such as a keyboard, which can be included in a plurality of input-/output devices 31. Turns counting will be started by the computer 29 when the joint reaches a reference or "hand tight" torque. When both the torque and turns criteria have been satisfied, the operator will be signaled by the computer through an output device such as a green light and a steady audio tone. The computer can signal a bad joint with a red light and a warbling audio tone. In addition, the computer can generate a dump signal through the tong remote unit 28 to the power tongs unit 21 to automatically shut down the power tongs upon reaching either a good or a bad joint. The computer 29 can also output signals representing the torque and turns values to a printer 32 such as a strip chart recorder or a digital printer, or a plotter, such as an x-y plotter.

Figure 2A:
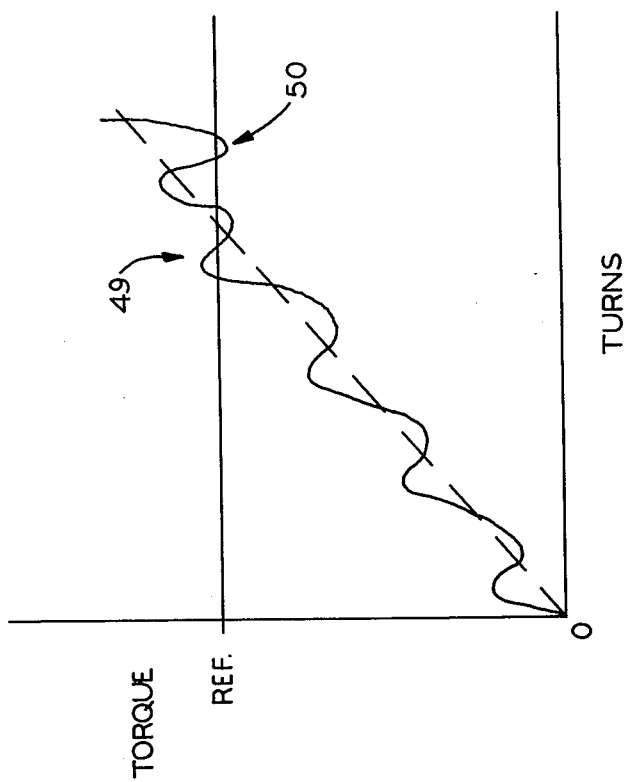
FIG. 2a is a plot of torque versus turns illustrating joint make-up values for typical joints.

Tables are available of ranges of torque and turns values which will result in a bearing pressure sufficient to form a pressure seal in a pipe joint. The minimum and maximum values for both torque and turns are read from the tables based upon the size, connection type, grade and weight for each string of pipe. These maximum and minimum values define an area 41 for a good joint and a typical plot of torque versus turns is shown in FIG. 2a. The counting of the turns begins only after a metal-to-metal or hand tight make-up has been achieved which is represented as the reference "REF" dashed line 42. The REF torque value provides a reference point after which a predetermined number of turns applied will induce a known stress in the joint provided that the thread and its materials are within the available specifications. In practice, however, turns alone cannot be relied upon to achieve proper stress levels in sealing engagement, since it is impractical to inspect each and every thread property and dimensions. Nor does the measurement of torque alone insure proper stress levels and sealing engagement because dimensional, material and frictional properties vary. Through practical and theoretical analysis, it has been shown that the make-up of threaded joints simultaneously within certain torque and turns parameters will insure joint integrity.

The computer 29 in FIG. 1 is responsive to the torque and turns signals for determining when a good joint has been made. When either a minimum torque or a minimum turns value has been reached, the computer 29 will then look for the minimum value of the other parameter and signal the operator that a good joint has been made if that minimum value of the other parameter is reached before the maximum value for the first parameter is reached. Thus, during make-up of the joint represented by a circle 43, the computer senses that the minimum turns value had been reached before the minimum torque value and stopped the make-up of the joint when the minimum torque value was reached. Conversely, during the make-up of the joint represented by a circle 44, the computer sensed the minimum torque value and, therefore, stopped the make-up of the joint when the minimum turns value was sensed. A joint represented by a circle 45 reached the maximum torque value before the minimum turns value was reached indicating a dirty, rough, damaged, improperly lubricated, or dimensional out of tolerance thread. A joint represented by a circle 46 reached the maximum turns value before reaching the minimum torque value, indicating a worn or out of tolerance thread, a weak or incorrect thread or coupling material, or perhaps the use of a non-standard thread lubricant or coating.

It is desirable to avoid making the joints 45 and 46 since they waste time and, in the case of the joint 45, places more stress on the pipe string than is required. Therefore, the apparatus shown in FIG. 1 automatically predicts such bad joints and stops the joint making process. A bad joint is predicted when, after reaching minimum torque, actual torque divided by actual turns is greater than maximum torque divided by minimum turns. These criteria define a boundary of an indicating area to the left of line 47 and above the minimum torque line as shown in FIG. 2a. A bad joint is also predicted when, after reaching minimum turns, the actual torque divided by the actual turns is less than the minimum torque divided by the maximum turns. These criteria define the boundaries of an indicating area below line 48 and to the right of the minimum turns line as shown in FIG. 2a. After either the torque or the turns value exceeds a corresponding minimum value, the computer monitors the actual torque and the actual turns values to prevent movement into one of the indicating areas defined above. When movement into either indicating area is detected, the computer 29 of FIG. 1 turns on a light indicating that a bad joint is being made. The computer 29 can also generate a dump signal through the tong remote unit 28 to shut off the power tongs unit 21.

The torque and turns values shown in FIG. 2a can also be utilized to generate other warning signals. For example, when the actual torque value exceeds the reference torque value REF, a light can be turned on to indicate to the operator to shift from a higher speed to a lower speed on the power tongs unit. Such operation increases the speed with which a joint can be made and decreases the chances of damaging the threads on either the pipe sections or the coupling. When the make-up line has reached either the minimum torque of the minimum turns value and is predetermined percentage from the minimum value of the other parameter, a light can be lighted to indicate to the operator that he should be ready to shut down the power tongs unit since the joint is almost finished. Typically, the percentage can be ninety percent. When the make-up line reaches the minimum torque value before reaching a LOW turns value, the make-up process can be stopped because the threads are probably misaligned and continued make-up will damage the threads.

The apparatus shown in FIG. 1 includes an automatic turns averaging feature. During the make-up of a pipe, the torque does not increase linearly with the turns. This is caused by such factors as wind loading on the pipe and non-concentric pipe.

Figure 2B:
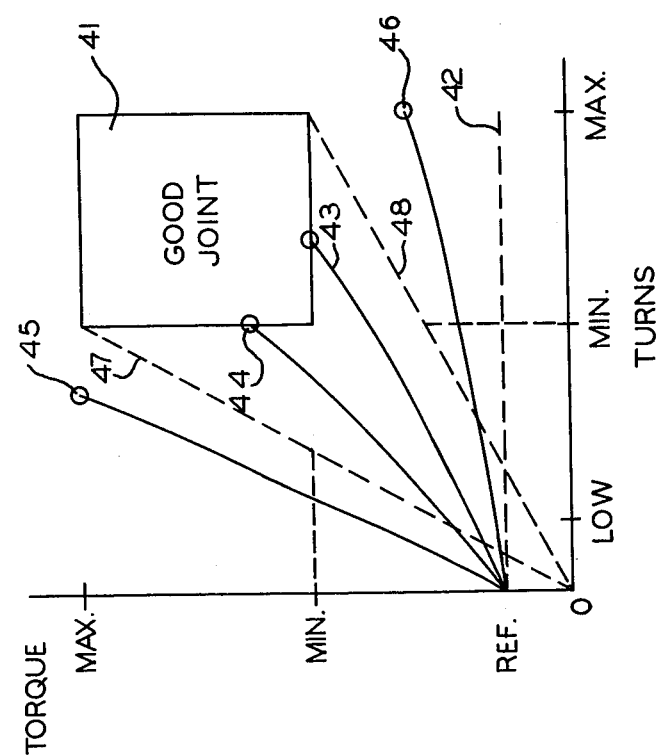
FIG. 2b is a plot of torque versus turns illustrating the turns averaging feature of the prior art apparatus.

FIG. 2b is a plot of torque versus turns wherein a straight dashed line represents the average applied torque and the solid, wavey line represents the actual torque which is applied. An area 49 of the actual torque line extends above a reference REF torque line and can represent one of more turns counts before the average torque exceeds the reference torque. An area 50 of the actual torque line extends below the reference torque line and can represent one or more turns counts after the average torque exceeds the reference torque.

In the prior art, the counting of turns was initiated and continued uninterrupted after the actual torque reached the REF torque line. Often, conditions such as wind loading on the pipe or non-concentric pipe would cause the actual torque to reach or exceed the REF torque line prematurely resulting in false turns being counted. These false turns were largely ignored or left up to the operator to observe and to compensate therefor. Thus, the false turns became a point for error. The apparatus shown in FIG. 1 automatically adjusts the turns count for false turns. The turns are counted by an up/down counter which counts turns when the actual torque is above the reference torque and subtracts turns when the actual torque is below the reference torque. However, when counting, the counter will count down to zero, but never become negative.

Figure 3:
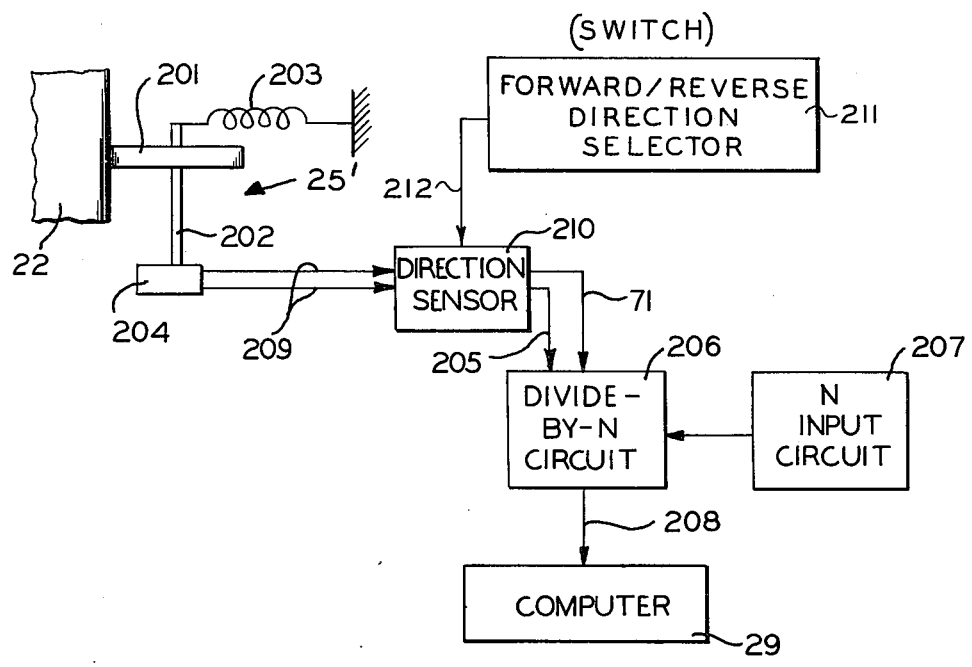
FIG. 3 is a block diagram of a high resolution turns counter according to the present invention.

In FIG. 3, there is shown a block diagram of a turns counter and associated circuitry according to the present invention. The turns counter 25', which may be mounted on the power tongs unit, includes an idler wheel 201 connected to a drive shaft 202. A spring means 203 is connected to the drive shaft 202 to bias the idler wheel 201 against the outside surface of the pipe section 22. As the pipe section 22 is rotated by the power tongs unit 21 (FIG. 1), the idler wheel is rotated by frictional engagement with the pipe section. The drive shaft 202 is coupled to the input of an optical encoder 204 which generates a pulse train output signal on a pair of lines 209 as the idler wheel is rotated.

The encoder 204 is well known, is commercially available and includes a wheel driven from the shaft 202 and having alternate clear and opaque sections (not shown) positioned about the periphery thereof. A light source is positioned on one side of the wheel and a photocell on the other side of the wheel. As the pipe section 22 rotates the idler wheel 201, the wheel in the encoder is rotated and the photocell detects alternate light and dark sections of the wheel. The photocell generates a square wave output signal each cycle of which represents an adjacent pair of clear and opaque sections and having a frequency proportional to the speed of rotation of the pipe section. The encoder 204 utilizes the photocell output signal to generate a pair of square wave pulse trains on the lines 209 ninety degrees out of phase. Thus, during each cycle of the photocell output signal, two leading and two trailing edges are generated between the pair of pulse trains.

Typically, the pulse trains are generated with a large number of pulses per revolution of the wheel. The two leading and two trailing edges can be utilized as inputs to a direction sensor circuit 210 to generate a square wave pulse train output signal on the line 71. Furthermore, the two pulse trains which are ninety degrees out of phase can be utilized to generate a signal representing the direction of rotation on a line 205.

The line 71 is connected to a counting input and the line 205 is connected to an inhibit input of a divide-by-N circuit 206. The circuit 206 is a presettable divide-by-N counter. The divide-by-N function may be accomplished with discrete logic circuitry or with a programmed microprocessor. An N input circuit 207 is connected to a preset input of the divide-by-N circuit 206 for generating a signal representing the number "N". Typically, the preset input accepts binary signals and the N input circuit 207 includes means, such as switches, for setting "N" in terms of ones, tens, and hundreds. The circuit 207 converts the decimal input from the switches into a binary signal which is generated to the circuit 206 to define the number "N". Of course, any suitable circuitry can be utilized to generate the "N" signal but the switches will maintain the number "N" during any power loss. The signal on the line 205 prohibits the divide by "N" circuit from outputting pulses to the computer 29 when the wheel 201 is rotating in the reverse direction.

A signal is sent on line 212 to the direction sensor 210 from the forward/reverse direction selector circuit 211. The circuit 211 allows the forward and reverse direction of the wheel 201 to be selected. Circuit 211 has a two position switch which is manually positioned by the operator. In one position when the wheel 201 rotates clockwise this is the forward direction and counter-clockwise is the reverse direction. When the switch is placed in the other position, clockwise rotation of the wheel 201 is the reverse direction and counter-clockwise rotation is the forward direction.

Each time a pulse is sent from the direction sensor 210 to the divide-by-N circuit 206 on line 71, when the wheel 201 is rotating in the forward direction, the number "N" is decremented. When the number "N" is counted down to zero, a pulse is then output on line 208 to the computer 29. This pulse represents a predetermined increment of rotation. The number "N" is placed back into the divide-by-N circuit 206 and the process is continued. When the wheel 201 is rotating in the reverse direction the number "N" is incremented. The divide-by-N circuit 206 counter will count up to a maximum value and then go to zero and then the number "N" is placed back into the counter and the process is continued.

As previously stated, the direction sensor circuit 210 places a signal on line 205 which prohibits the divide-by-N circuit 206 from outputting a pulse to the computer 29 when the wheel 201 is rotating in the reverse direction. Since the turns counter 25 may be mounted on the power tongs unit and if the power tongs are allowed to pivot back and forth around the pipe section 22, erroneous pulses could be output by the divide-by-N circuit 206 to the computer 29. The up/down counting ability of the divide-by-N circuit 206 compensates for the back and forth pivoting of the power tongs and prevents the outputting of any erroneous pulses.

If we assume, for the purposes of illustration, that the outside diameter of the pipe section 22 is five times the diameter of the idler wheel 201, then the encoder 204 will generate fifty thousand pulses for each revolution of the pipe section. If "N" is set at five hundred at the N input circuit 207, the divide-by-N circuit 206 will generate one hundred pulses for each revolution of the pipe section on a line 208 and each pulse will represent one percent of one turn of the pipe section. It can be seen that the turns counter according to the present invention can be utilized with a wide range of pipe section diameters simply by matching the number "N" to the ratio between the idler wheel diameter and the pipe section outer diameter to maintain the signal on the line 208 at one hundred pulses per pipe section revolution. Furthermore, the number "N" can also be selected to increase or decrease the resolution of one percent per pulse. The turns counter according to the present invention has significantly higher resolution than the prior art turns counters which generate a signal each one tenth of a revolution.

The turns counter according to the present invention is especially useful in the makeup of premium threaded connections. In such a connection, the number of turns made between the reference torque position and the minimum torque position (see FIG. 2a) is very small, sometimes less than one complete turn. Thus, a finer resolution than one tenth of a turn is required in order to make a good joint. In a premium type shouldering connection, it is desired to have a metal-to-metal seal between the end surface of the pipe section and a shoulder surface in the pipe coupling. In the prior art apparatus, it was assumed that such a seal had been made when a predetermined torque value had been reached. With the present invention, a number of turns or a fraction of a turn can be measured when simultaneously reaching a particular torque value to more accurately define when the seal has been made.

For example, assume that the pipe diameter to idler wheel diameter ratio is five and it is desired to make 0.7 turn. If the number "N" is set at 350, the divide-by-N counter will generate one hundred output pulses in 0.7 turn of the pipe section, each pulse representing one percent of the desired rotation.

In each of the above examples, the number "N" can be found with a simple formula. If it is desired to generate "P" pulses per revolution of the member of the joint being rotated, and the joint member outside diameter is "OD", the idler wheel diameter is "WD", and the encoder generates "E" pulses per revolution of the idler wheel, then the formula for "N" is:

$$N = (OD/WD)(E/P)$$

If it is desired to generate "P" pulses in a predetermined number of turns "T" of the joint member, then the formula for "N" is:

$$N = T(OD/WD)(E/P)$$

Figure 4:
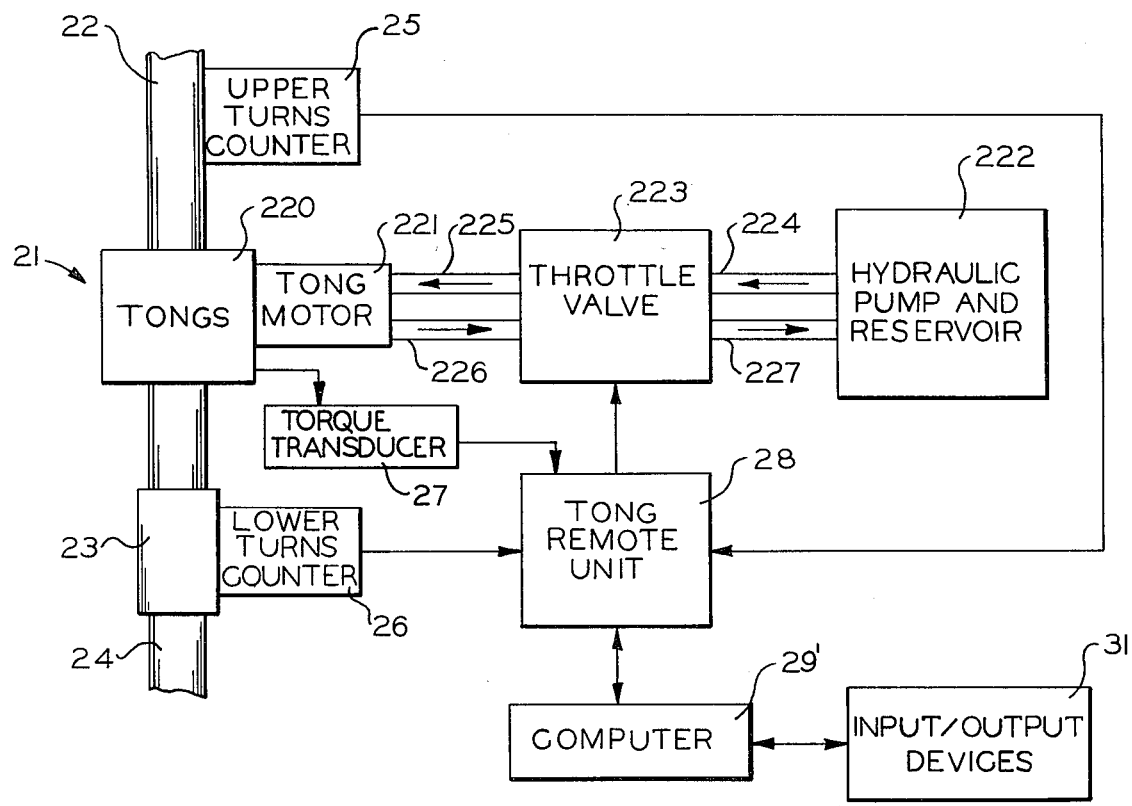
FIG. 4 is a block diagram of an apparatus for threading pipe and a control system therefor according to the present invention.

There is shown in FIG. 4 an apparatus for threading pipe and a control system therefor. The pipe sections 22 and 24, the pipe coupling 23, the torque transducer 27, the tong remote unit 28 and the input/output devices 31 are similar to the like-numbered elements shown in FIG. 1. The turns counters 25 and 26 can be of the type shown in FIG. 1 or of the type shown in FIG. 3. A power tongs unit 21 includes tongs 220 for gripping the pipe section 22, a tong motor 221 for rotating the tongs 220, and a hydraulic pump and reservoir 222 for generating hydraulic fluid under pressure to drive the motor 221. The tongs 220, the motor 221 and the pump and reservoir 222 are well-known in the industry and are not shown in detail.

A throttle valve 223 is connected between the motor 221 and the pump and reservoir 222. When the valve 223 is actuated, pressurized fluid flows from the pump and reservoir 222 through a supply line 224, through the valve 223, through a supply line 225, and to the motor 221. Fluid flows from the motor 221, through a return line 226, through the valve 223, through a return line 227, and back to the pump and reservoir 222. When the valve 223 is actuated, a bypass port (not shown) is opened to connect the lines 224 and 227 and the pressure to the motor 221 is relieved.

In the prior art system shown in FIG. 1, the computer 29 can generate a dump signal through the tong remote unit 28 to the power tongs unit 21 to automatically shut down the power tongs upon reaching either a good joint or a bad joint. In the system shown in FIG. 4, the computer 29' can generate the dump signal to actuate the valve, but also can generate a control signal through the tong remote unit 28 to control the throttle valve 223 as will be described below.

Galling, the tearing or deforming of the threads on a pipe or coupling, can be substantially reduced or eliminated by limiting the relative speed of rotation between two members being threaded together. The system shown in FIG. 4 can be utilized to warn the operator to slow down the speed of the power tongs unit 21 or to automatically control the speed utilizing the throttle valve 223. The computer 29' is similar to the computer 29 of FIG. 1 and includes a clock which generates a clock signal at a predetermined frequency. The computer 29' can be programmed, or a standard counting circuit can be connected thereto, to accumulate clock pulses and generate an elasped time signal. The elapsed time for the maximum desired rate can be inputted to the computer 29' through the input/output devices 31 keyboard and stored. Each time a turn signal pulse is received from the turns counter 25, the time elapsed from the last turn signal pulse can be compared with the stored time to determine if the maximum rotation rate has been exceeded.

Figure 5:
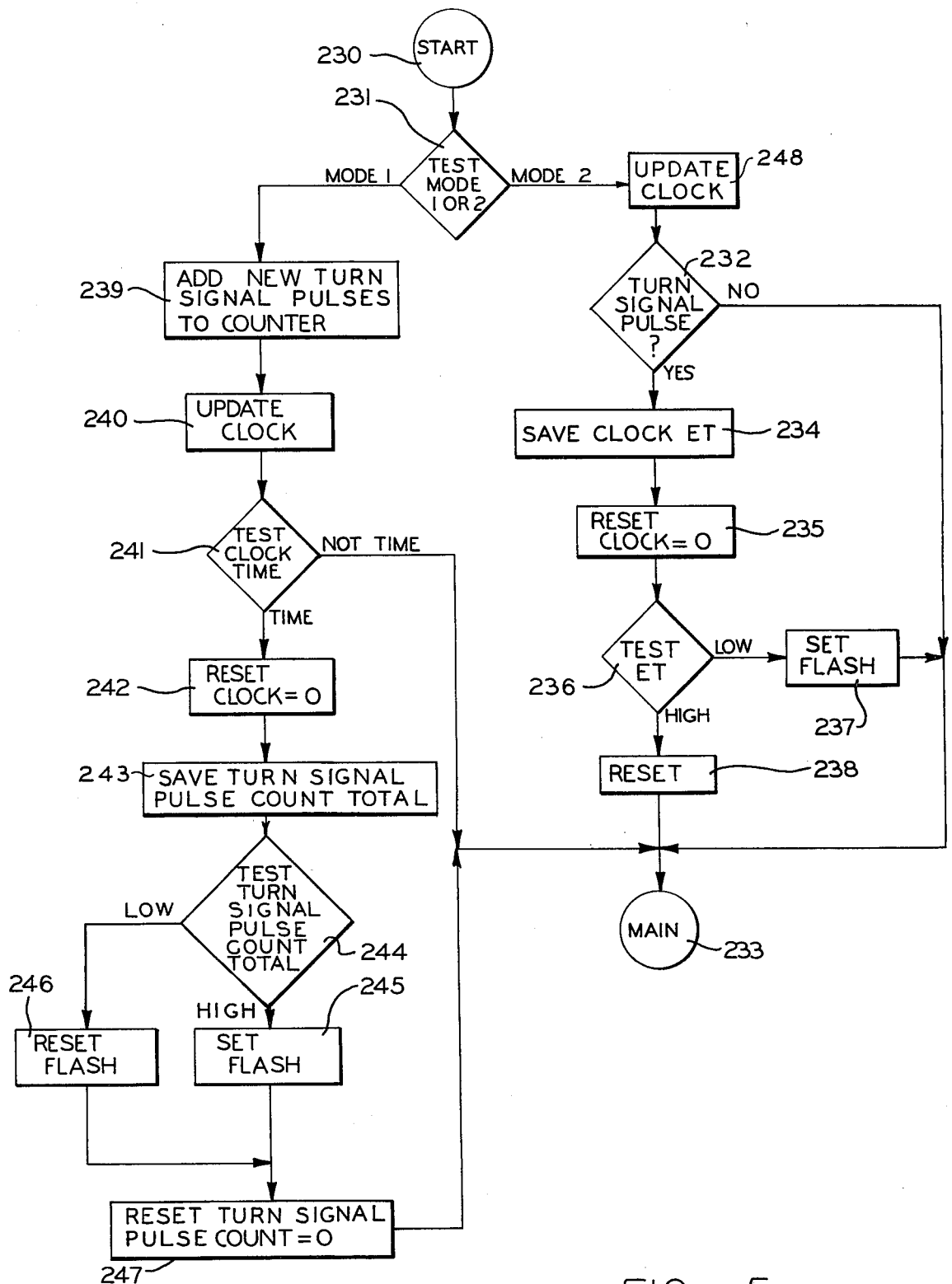
FIG. 5 is a flow diagram for the computer in the apparatus shown in FIG. 4 for warning the operator when a maximum rotation rate is exceeded.

There is shown in FIG. 5 a flow diagram of a program for the computer 29' whereby a warning is generated to the operator of the apparatus when a maximum rotation rate is exceeded. The program begins at a circle START 230 and enters a decision point TEST MODE 1 or 2 231. The operator must determine what mode to operate in for the particular pipe speed that must be tested. Two modes are required to test a range of rotation speeds from slow, with pulses every one tenth of a turn, to fast, with as many as two hundred pulses per revolution. In Mode 1, the frequency or pulse rate is measured for the faster speeds. In Mode 2, the period or time between pulses is measured for the slower speeds.

If Mode 2 is selected, typically utilizing a switch on the computer 29', the program branches from the decision point 231 at MODE 2 to a program instruction UPDATE CLOCK 248 which updates the elapsed time by adding the time elapsed since the last time the clock was updated. The program then enters a TURN SIGNAL PULSE ? decision point 232. If no turn signal pulse has been generated, the program branches at NO to a circle MAIN 233 and returns to the main program until the next time the program enters at the circle 230. Since the rate at which the computer branches from the main program to the program shown in FIG. 5 exceeds the maximum expected pulse rate for the slower speeds, the program will loop while waiting for a turn signal pulse. If a turn signal pulse has been generated, the program branches at YES to execute a program instruction SAVE CLOCK ET 234 causing the computer to save the value of the elapsed time ET accumulated between turn signal counter pulses. Then the program executes a program instruction RESET CLOCK=0 235 to reset the accumulated time ET to zero for accumulating a new elapsed time.

The program then enters a decision point TEST ET 236 where the stored value of the elapsed time ET is tested for a low or a high value. If the time is lower than a predetermined value, the turn signal pulses are occurring to rapidly indicating that the speed of rotation is too high. The program branches at LOW to execute a program instruction SET FLASH 237 to generate a signal to indicate to the operator that he should slow down the speed of rotation. In response, the operator will slow down the speed of rotation and the light will be turned off. The program enters the circle 233 to return to the main program. If the time is higher than the predetermined value, the turn signal pulses are occuring more slowly indicating that the speed is below the warning value. The program branches from the decision point 236 at HIGH to execute a program instruction RESET 238 to reset the flashing light. The program then enters the circle 233 to return to the main program. The program instructions 237 and 238 can also be utilized to directly control the speed of the power tongs unit.

If Mode 1 is selected, the program branches from the decision point 231 at MODE 1 to execute a program instruction ADD NEW TURN SIGNAL PULSES TO COUNTER 239 which adds the TURN SIGNAL PULSES which have occurred since the last loop through the program of FIG. 5 to a count total in a counter. Next, the program executes a program instruction UPDATE CLOCK 240 which updates the elapsed time by adding the time elapsed since the last time the clock was updated. The program then enters a decision point TEST CLOCK TIME 241 to compare the elapsed time with a predetermined value to determine if sufficient time has elapsed to test the numbers of turn signal pulses. If the elapsed time is too low, the program branches at NOT TIME to the circle 233 to return to the main program.

If the test period has elapsed, the program branches from the decision point 241 at TIME to execute a program instruction RESET CLOCK=0 242 to reset the elapsed time to zero. Then the program executes a program instruction SAVE TURN SIGNAL PULSE COUNT TOTAL 243 to save the count total in the counter. The program then enters a decision point TEST TURN SIGNAL PULSE COUNT TOTAL 244 to compare the count total with a predetermined value. If the count total is high, the program branches at HIGH to execute a program instruction SET FLASH 245 to indicate that the maximum desired speed has been exceeded. If the count total is too low, the program branches at LOW to execute a program instruction RESET FLASH 246 to reset the flashing light. The program instructions 245 and 246 can also be utilized to control the power tongs unit. The program executes a program instruction RESET TURN SIGNAL PULSE COUNT=0 247 after either of the instructions 245 and 246 to reset the count total to zero. The program then exits to the main program at the circle 233.

All of the accumulated values in the program of FIG. 5 can be initialized at the beginning of the main program. In Mode 1, the count pulse rate is relatively high. Therefore, the program counts the number of pulses occurring in a predetermined elapsed time to determine the speed of rotation. In Mode 2, the count pulse rate is relatively low. Therefore, the program accumulates the elapsed time between count pulses to determine the speed of rotation.

Figure 6A:
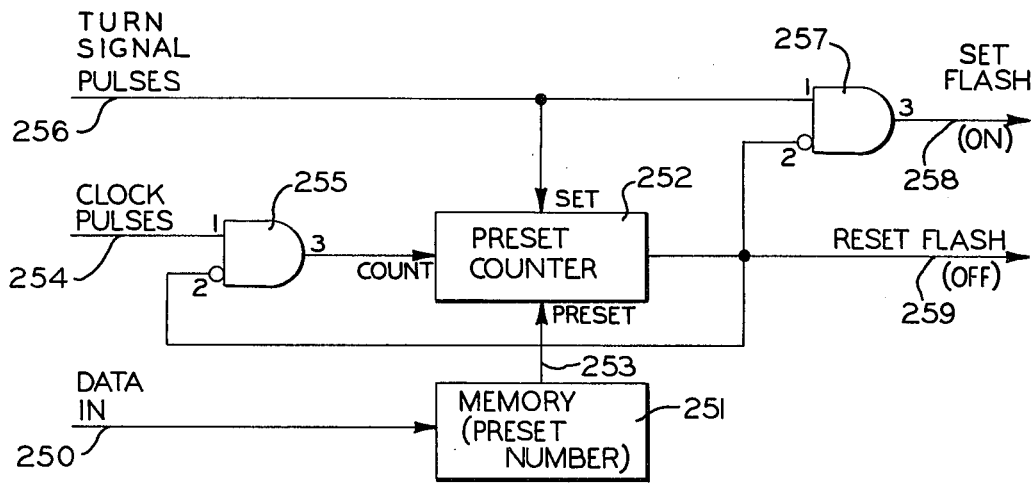
FIGS. 6a and 6b are block diagrams of logic circuits for the control system shown in FIG. 4 for warning the operator when a maximum rotation rate is exceeded.

There is shown in FIG. 6a, in block diagram form, a logic circuit substantially equivalent to the logic of the flow diagram of Mode 2 of FIG. 5. A number representing a minimum number of turn signal pulses between clock pulses is inputted on a DATA IN line 250 to a memory 251. This number is loaded into a preset counter 252 on a line 253 at a preset input. The clock pulses are an input on a line 254 to an input 255-1 of an AND gate 255. The turn signal pulses from the counter are an input on a line 256 to a set input of the counter 252 and an input 257-1 of an AND gate 257. An output of the counter 252 is connected to an inverting input 257-2 of the AND gate 257 which has an output 257-3 connected to a SET FLASH line 258. The output of the counter 252 is also connected to a RESET FLASH line 259 and to an inverting input 255-2 of the AND 255. The AND 255 has an output 255-3 connected to a count input of the counter 252.

When a turn signal pulse occurs, the counter 252 is set to the preset number. The counter is responsive to the clock pulses to count down from the preset number. The counter generates a "0" output to enable the AND 255, and the AND 257. If the preset number is reached before the next turn signal pulse occurs, the counter generates a "1" on the line 259 to reset the flashing light and disable the ANDs 255 and 257. The next turn signal pulse again sets the counter to the preset number and the counter enables the ANDs 255 and 257. If the next turn signal pulse occurs before the preset number of clock pulses has been counted down to zero, the AND 257 generates a "1" on the line 258 to set the flashing light to indicate that the maximum speed of rotation has been exceeded. The turn signal pulse also sets the counter 252 to restart the counting cycle.

Figure 6B:
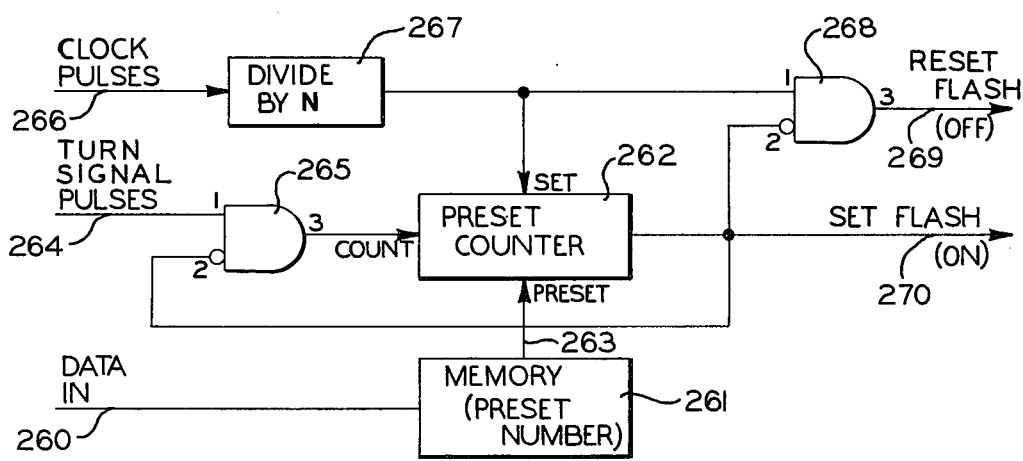

There is shown in FIG. 6b, in block diagram form, a logic circuit substantially equivalent to the logic of the flow diagram of Mode 1 of FIG. 5. A number representing a maximum number of turn signal pulses per twenty clock pulses in inputted on a DATA IN line 260 to a memory 261. This number is loaded into a preset counter 262 on a line 263 at a preset input. The turn signal pulses are an input on a line 264 to an input 265-1 of an AND gate 265. The clock pulses are an input on a line 266 to a divide-by-twenty counter 267. An output of the counter 267 is connected to a set input of the counter 262 and an input of an AND gate 268. An output of the counter 262 is connected to an inverting input 268-2 of the AND 268 which has an output 268-3 connected to a RESET FLASH line 269. The output of the counter 262 is also connected to a SET FLASH line 270 and to an inverting input 265-2 of the AND 265. The AND 265 has an output 265-3 connected to a count input of the counter 262.

After twenty clock pulses occur, the counter 267 generates a "1" to set the counter 262 to the preset number. The counter 262 is responsive to the turn signal pulses to count down from the preset number. The counter 262 generates a "0" output to enable the ANDs 265 and 268. If the preset number is counted down to zero before twenty more clock pulses occur, the counter 262 generates a "1" on the line 270 to set the flashing light and disable the ANDs 265 and 268. When the counter 267 generates a "1", the counter 262 is reset and the ANDs 265 and 268 are enabled to restart the counting cycle. If the counter 267 generates a "1" before the preset number of turn signal pulses is counted, the AND 268 generates a "1" on the line 269 to reset the flashing light and the counter 262 is reset.

The SET FLASH instructions 237 and 245 of FIG. 5 or the SET FLASH signals on the lines 258 and 270 of FIGS. 6a and 6b respectively can be utilized to control the valve 223 of FIG. 4. If the valve 223 is actuated when the set flash in indicated, the valve 223 will be modulated as the speed of rotation is alternately increased and decreased. The control can be achieved by utilizing conventional pulse width modulated circuitry to match the response time of the valve and the motor.

In summary, the present invention concerns an increased resolution turns counter for an apparatus for counting turns when making threaded joints from a pair of threaded members. The apparatus includes means for rotating one of the members with respect to the other member, means for generating a signal representing actual turns made by the one member. The actual turns signal generating means comprises means responsive to the rotation of the one member for generating a first plurality of pulses at a first frequency proportional to the speed of rotation of the one member, and means responsive to the first plurality of pulses for generating a second plurality of pulses at a second frequency lower than the first frequency, each pulse of the second plurality representing a predetermined increment of rotation of the one member. The means responsive to the rotation of the one member includes an idler wheel, means for biasing the idler wheel against an outside surface of the one member, an encoder means, and a drive shaft coupled between the idler wheel and the encoder means. The means for generating the second plurality of pulses includes means for dividing the first plurality of pulses by a predetermined number N to generate the second plurality of pulses. The means for dividing includes a divide-by-N counter and the means for generating the second plurality of pulses also includes means for generating a preset signal representing the value of "N" to the counter. The apparatus also includes means for effecting a signal to permit or prohibit the divide-by-N circuit from outputting a pulse to the computer when the wheel is rotating in either forward or reverse directions.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In an apparatus for making threaded joints from a pair of threaded members including means for rotating one of the members with respect to the other member and means for generating a signal representing the actual turns made by the one member, the actual turns signal generating means comprising: means responsive to the rotation of the one member for generating a first plurality of pulses at a first frequency proportional to the speed of rotation of the one member, said means for generating said first plurality of pulses including an idler wheel engaging the outer surface of the one member, an encoder means for generating said first plurality of pulses upon rotation thereof, and means coupling said idler wheel in driving relationship to said encoder means; and means responsive to said first plurality of pulses for generating said actual turns signal as a second plurality of pulses at a second frequency lower than said first frequency, said means for generating said second plurality of pulses including means for dividing said first plurality of pulses by a predetermined number N to generate said second plurality of pulses, the value of said predetermined number N being equal to a first value representing the outside diameter of the one member divided by the diameter of said idler wheel, multiplied by a second value representing the number of pulses generated by said encoder means per revolution of said idler wheel divided by a number of pulses desired per revolution of the one member.

2. The apparatus according to claim 1 including means for biasing said idler wheel into engagement with the one member.

3. The apparatus according to claim 1 wherein said encoder means includes an optical encoder coupled to said means driven by the one member for generating said first plurality of pulses.

4. The apparatus according to claim 1 wherein said means for dividing includes a divide-by-N counter responsive to said first plurality of pulses for generating said second plurality of pulses.

5. The apparatus according to claim 4 including means for generating a preset signal representing the value of N and wherein said counter is responsive to said preset signal for dividing said first plurality of pulses by the value of N.

6. The apparatus according to claim 4 further comprising a direction sensor and means for effecting a signal to selectively permit or prohibit the divide-by-N counter from outputting a pulse when said sensor is receptive to each of opposing directions.

7. In an apparatus for making threaded joints from a pair of threaded members including means for rotating one of the members with respect to the other member and means for generating a signal representing the actual turns made by the one member, the actual turns signal generating means comprising: means responsive to the rotation of the one member for generating a first plurality of pulses at a first frequency proportional to the speed of rotation of the one member, said means for generating said first plurality of pulses including an idler wheel engaging the outer surface of the one member, an encoder means for generating said first plurality of pulses upon rotation thereof, and means coupling said idler wheel in driving relationship to said encoder means; and means responsive to said first plurality of pulses for generating said actual turns signal as a second plurality of pulses at a second frequency lower than said first frequency, said means for generating said second plurality of pulses including means for dividing said first plurality of pulses by a predetermined number N to generate said second plurality of pulses, the value of said predetermined number N being equal to a first value representing the outside diameter of the one member divided by the diameter of said idler wheel, multiplied by a second value representing the number of pulses generated by said encoder means per revolution of said idler wheel divided by a desired number of pulses in a predetermined number of turns, multiplied by a third value representing said predetermined number of turns.

8. The apparatus according to claim 7 including means for biasing said idler wheel into engagement with the one member, and wherein said encoder means includes an optical encoder coupled to said drive shaft for generating said first plurality of pulses.

9. The apparatus according to claim 7 wherein said means for dividing includes a divide-by-N counter responsive to a preset signal for dividing said first plurality of pulses by the value of N and means for generating said preset signal.

10. The apparatus according to claim 9 further comprising a direction sensor for sensing a direction of rotation of the one member and for generating a signal representing the direction of rotation to selectively prohibit the divide-by-N counter from outputting a pulse when said direction sensor detects rotation of the one member in a direction opposite a desired direction.

* * * * *